US006724786B2

(12) United States Patent
Jacobowitz et al.

(10) Patent No.: US 6,724,786 B2
(45) Date of Patent: Apr. 20, 2004

(54) VARIABLE OPTICAL ATTENUATOR USING WAVELENGTH LOCKED LOOP TUNING

(75) Inventors: Lawrence Jacobowitz, Wappingers Falls, NY (US); Casimer Maurice DeCusatis, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/944,276

(22) Filed: Aug. 31, 2001

(65) Prior Publication Data

US 2003/0042407 A1 Mar. 6, 2003

(51) Int. Cl.[7] .................................................. H01S 3/10
(52) U.S. Cl. .................... 372/20; 398/158; 250/227.21; 385/140
(58) Field of Search ................. 385/140; 250/205–206, 250/226, 227.11, 214 AG, 227.19, 227.21, 227.23, 227.27, 216; 398/158; 372/20, 29.01–29.023, 4; 359/115, 589; 356/460–461, 472, 474–475

(56) References Cited

U.S. PATENT DOCUMENTS

| | | | | | |
|---|---|---|---|---|---|
| 5,401,956 | A | * | 3/1995 | Dunphy et al. | 250/227.18 |
| 6,289,028 | B1 | * | 9/2001 | Munks et al. | 372/20 |
| 6,389,046 | B1 | * | 5/2002 | Stayt et al. | 372/29.02 |
| 6,526,079 | B1 | * | 2/2003 | Watterson et al. | 372/32 |
| 6,597,840 | B2 | * | 7/2003 | Jacobowitz et al. | 385/37 |

OTHER PUBLICATIONS

"Introduction to DWDM Technology Data in a Rainbow", by Stamatios V. Kartalopoulos, Lucent Technologies, IEEE Communications Society, Sponsor, SPIE Optical Engineering Press, pp. 65–68.

"Introduction to DWDM Technology Data in a Rainbow", by Stamatios V. Kartalopoulos, Chapter 9, pp. 131–136.

"Distributed feedback semiconductor lasers", by John Carroll, et al., IEE Circuits, Devices and Systems Series 10, SPIE Press Monograph vol. PM52, 1998, pp. 7–15.

"Micromachining system accommodates large wafers", by Robert Bann, et al., Laser Focus World—The 2001 Annual Survey of the Laser Marketplace, Jan. 2001, pp. 189–192.

* cited by examiner

*Primary Examiner*—David Porta
*Assistant Examiner*—Patrick J. Lee
(74) *Attorney, Agent, or Firm*—Scully, Scott, Murphy & Presser; Tiffany L. Townsend, Esq.

(57) ABSTRACT

A system and method for automatically attenuating optical signals transmitted in optical systems. The system and method exploits a wavelength-locked loop servo-control circuit and methodology that enables real time mutual alignment of the center wavelength of an optical signal having a peaked spectrum function and transmitted through the optical system, and a center wavelength of a wavelength selective device such as an optical filter element implementing a peaked passband function. The wavelength-locked loop servo-control circuit and methodology particularly is capable of real-time aligning the center wavelength of an optical signal in a range between maximum overlap with the center wavelength of the peaked passband function of the optical filter for maximum transfer of output optical signal by the filter element and minimum overlap with the peaked passband function of the optical filter so that output optical signal may be attenuated in the optical system.

16 Claims, 6 Drawing Sheets

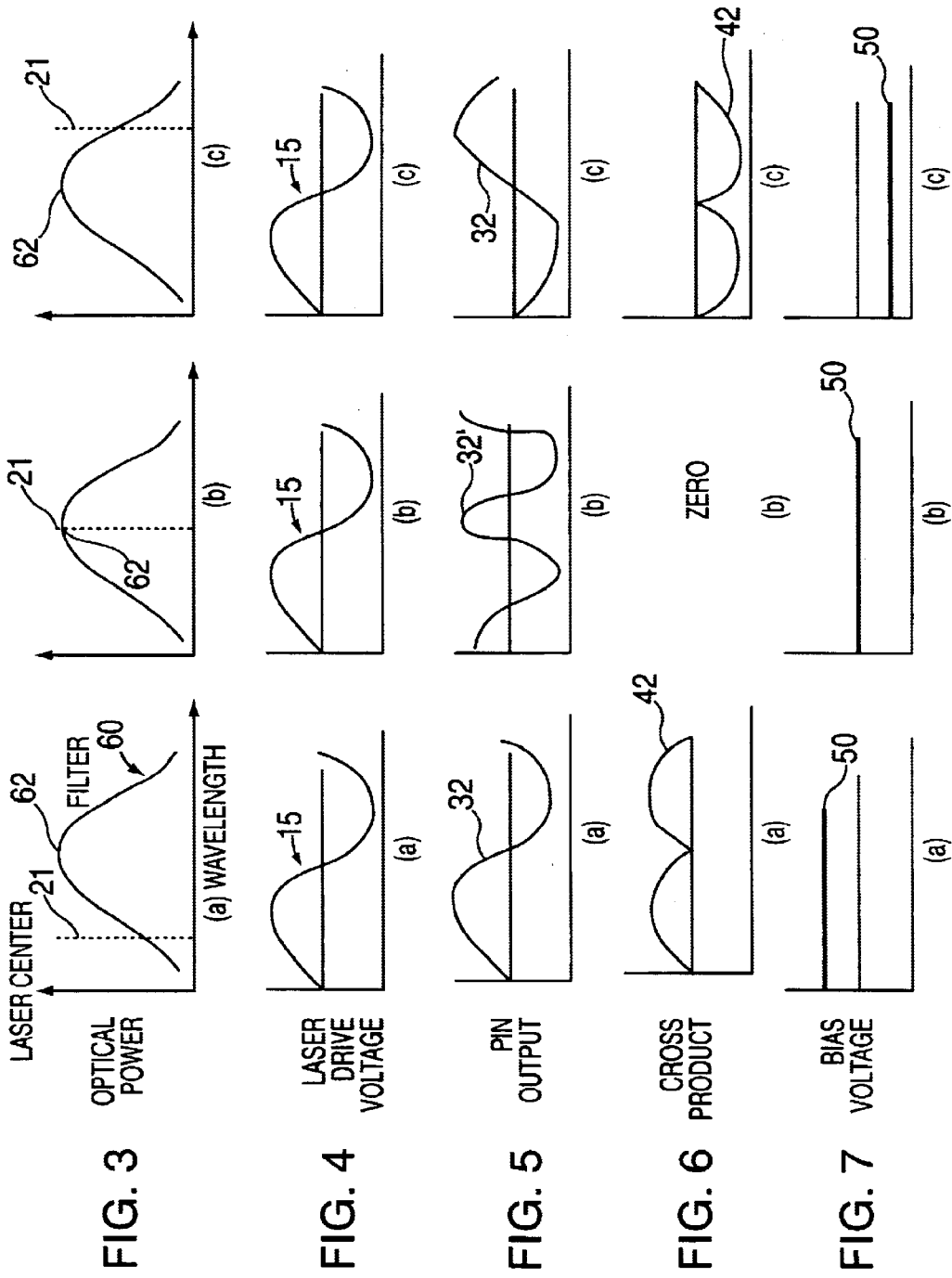

VARIABLE OPTICAL ATTENUATOR USING WAVELENGTH LOCKED LOOP TUNING

BACKGROUND OF THE INVENTION

1. Field of the Invention

The present invention relates generally to optical devices such as lasers, and fiber optic data transmission systems employing the same, and particularly to a novel variable optical signal attenuator device for use in such systems that implements a wavelength-locked loop servo-control circuit.

2. Description of the Prior Art

Wavelength Division Multiplexing (WDM) and Dense Wavelength Division Multiplexing (DWDM) are light-wave application technologies that enable multiple wavelengths (colors of light) to be paralleled into the same optical fiber with each wavelength potentially assigned its own data diagnostics. Currently, WDM and DWDM products combine many different data links over a single pair of optical fibers by re-modulating the data onto a set of lasers, which are tuned to a very specific wavelength (within 0.8 nm tolerance, following industry standards). On current products, up to 32 wavelengths of light can be combined over a single fiber link with more wavelengths contemplated for future applications. The wavelengths are combined by passing light through a series of thin film interference filters, which consist of multi-layer coatings on a glass substrate, pigtailed with optical fibers. The filters combine multiple wavelengths into a single fiber path, and also separate them again at the far end of the multiplexed link. Filters may also be used at intermediate points to add or drop wavelength channels from the optical network.

Optical communication links in systems employing WDM or, optical networks in general, require amplification to extend their distances. However, for some optical network applications it is advantageous to be able to provide for the attenuation of optical signals. For example, optical attenuator devices are often implemented to control light levels in fiber optic networks in order to prevent saturation and other effects.

It would thus be highly desirable to provide an optical attenuator device in an optical system that does not comprise a separate optical component in the network.

It would be further highly desirable to provide a variable optical attenuator device in an optical system that may be easily integrated in a simple feedback circuit without requiring a separate optical component in the network.

It would be highly desirable to provide a servo-control feedback loop for dynamically tracking the center wavelength of an optical signal to the peak of an optical filter passband with high accuracy to enable precise optical attenuation of optical signals.

SUMMARY OF THE INVENTION

It is therefore an object of the present invention to provide an optical attenuator device in an optical system that does not comprise a separate optical component in the network.

It is another object of the present invention to provide variable optical attenuator device in an optical system that may be easily integrated in a simple feedback circuit without requiring a separate optical component in the network.

It is a further object of the present invention to provide a servo-control feedback loop for dynamically tracking the center wavelength of an optical signal to the peak of an optical filter passband with high accuracy to enable precise optical attenuation of optical signals.

It is still another object of the present invention to provide a servo/feedback loop, referred to as a "wavelength-locked loop," that provides tracking of the center wavelength of the optical signal to the peak of an optical filter passband to achieve a desired attenuation of the optical signal for fiber optic data communication systems.

According to a preferred embodiment of the invention, there is provided a system and method for attenuating optical signals communicated in an optical network comprising: an optical signal generator for generating optical signals, each optical signal having a peaked spectrum function including a center wavelength; an optical filter element for receiving and filtering an optical signal, the optical filter element exhibiting a peaked passband function including a center wavelength; and, a wavelength-locked loop servo-control circuit for enabling real time alignment of the optical signal center wavelength with the peaked passband function of the optical filter, the optical signal center wavelength capable of being aligned at a wavelength corresponding to maximum overlap with the center wavelength of the peaked passband function of the optical filter for maximum transfer of the output optical signal by the filter element and minimum overlap with the peaked passband function of the optical filter so that the output optical signal may be attenuated in the optical system.

Advantageously, the wavelength-locked loop for providing attenuating optical signals according to the invention, is advantageous for application areas such as radar and sonar signal processing, image sampling and transmission, holographic storage, and other areas while preserving life of the optical signal generator devices. Furthermore, the VOA system of the invention may be employed to provide gain equalization in a laser array or bank of lasers and, additionally, may be applicable to single comb filters which are comprised of periodic or a periodic spectral passbands allowing channels to be 'provisioned' and attenuated in a controlled pattern, e.g., in a 'tilted spectral' function or uniformly to equalize the optical power across all wavelengths in the WDM system, particularly to compensate for optical amplifier effects.

BRIEF DESCRIPTION OF THE DRAWINGS

Further features, aspects and advantages of the apparatus and methods of the present invention will become better understood with regard to the following description, appended claims, and the accompanying drawings where:

FIGS. 3(a)–3(b) are signal waveform diagrams depicting the relationship between laser optical power as a function of wavelength for three instances of optic laser signals;

FIGS. 4(a)–4(c) are signal waveform diagrams depicting the laser diode drive voltage dither modulation (a sinusoid) for each of the three waveform diagrams of FIGS. 3(a)–3(c);

FIGS. 5(a)–5(c) are signal waveform diagrams depicting the resulting feedback error signal output of the PIN diode for each of the three waveform diagrams of FIGS. 3(a)–3(c);

FIGS. 6(a)–6(c) are signal waveform diagrams depicting the cross product signal resulting from the mixing of the amplified feedback error with the original dither sinusoid;

FIGS. 7(a)–7(c) are signal waveform diagrams depicting the rectified output laser bias voltage signals which are fed back to adjust the laser current and center frequency;

DETAILED DESCRIPTION OF PREFERRED EMBODIMENTS

Figure 1A:
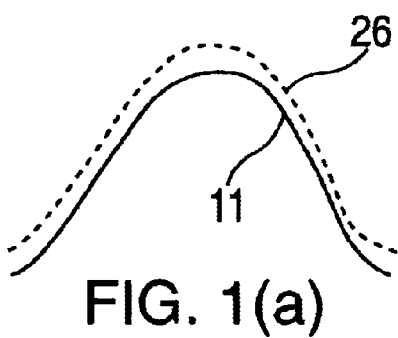
FIGS. 1(a)–1(c) depict example degrees of alignment between the peaked spectra of an optical signal and the passband of an optical filter for providing varying degrees of optical attenuation.
Figure 1B:
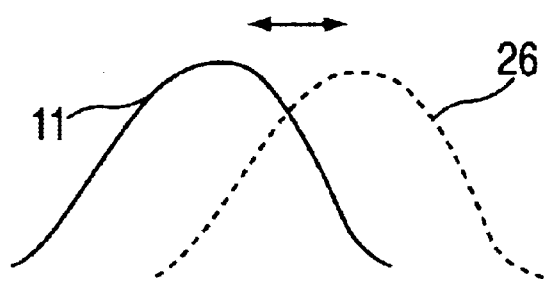
Figure 1C:
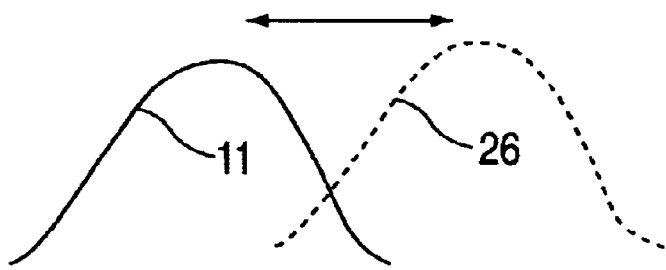

The present invention is directed to a variable optical attenuator ("VOA") device for fiber optic networking systems. The basic concept underlying the variable optical attenuator concept according to the principles of the invention is shown in FIGS. 1(a)–1(c). FIG. 1(a) depicts an example spectra 11 of an optical signal having a peaked center wavelength shown overlapping the peaked passband optical filter function 26 response in the frequency domain for achieving maximum optical signal transmission of the optical signal through the filter. FIG. 1(b) depicts the example optical signal spectra 11 shown partially overlapping the peaked passband filter function 26 response in the frequency domain for introducing some attenuation of the optical signal. FIG. 1(c) depicts the optical signal spectra 11 shown minimally overlapping the peaked passband filter function 26 response in the frequency domain for introducing very high attenuation of the optical signal. It is apparent that as the filter and laser are moved out of alignment in the spectral domain, the optical attenuation is increased in a controlled manner. The present invention is directed to a programmable VOA implementing a novel servo-control loop which can be used to tune either a single laser and/or filter source or a combination of filters and sources to any desired level of light output.

The explanations herein discuss both wavelength and frequency, which have a reciprocal relationship ($\lambda = c/f$, where c=speed of light), as is well known in the field of optics.

Figure 2A:
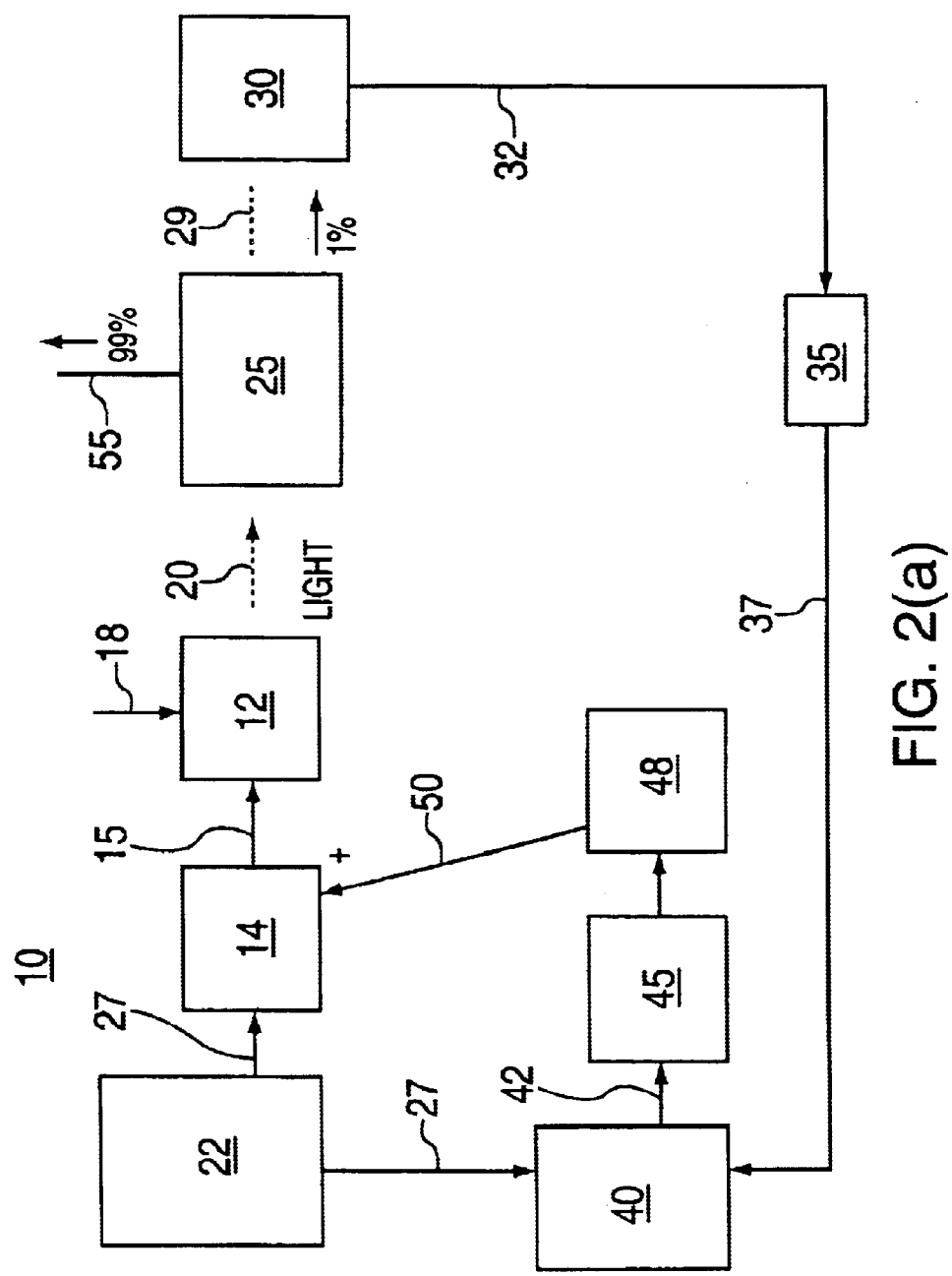
FIGS. 2(a) and 2(b) depict examples underlying wavelength-locked loop system architectures.

As shown in FIG. 2(a), the novel servo-control system implements a principle referred to herein as the "wavelength-locked loop" or "lambda-locked loop" (since the symbol lambda is commonly used to denote wavelength). The basic operating principle of the wavelength-locked loop (WLL) is described in greater detail in commonly-owned, co-pending U.S. patent application Ser. No. 09/865,256 entitled APPARATUS AND METHOD FOR WAVELENGTH-LOCKED LOOPS FOR SYSTEMS AND APPLICATIONS EMPLOYING ELECTROMAGNETIC SIGNALS, the whole contents and disclosure of which is incorporated by reference as if fully set forth herein.

Particularly, as described in commonly-owned, co-pending U.S. patent application Ser. No. 09/865,256, and with reference to FIG. 2(a), the wavelength-locked loop principle implements a dither modulation to continuously adjust an electromagnetic signal source characterized as having a peaked frequency spectrum or peaked center wavelength, e.g., a laser light source, so as to track the center of a frequency selective device, e.g. a filter passband. In this manner, optimal power of the signal may be transmitted for optimal use of the system transmission bandwidth. The principle may be exploited for tuning any light source having a peaked frequency spectrum, and additionally, may be used to tune or adjust transmission properties of frequency selective devices such as tunable filters.

For purposes of description, the basic operating principle of the WLL is shown in FIG. 2(a) which depicts an example optic system 10 including a light source such as laser diode 12 driven with both a bias voltage 15 from a voltage bias circuit 14, and modulated data 18 from a data source (not shown). It should be understood, however, that the laser diode does not need to be modulated by any data; its optical output power remains constant. Only the laser wavelength is modulated by the bias current. The laser diode's wavelength is controlled by the bias current in this embodiment, although other applications are possible using feedback to thermoelectric coolers (to vary the wavelength by controlling the laser temperature) or to microelectromechanical optical elements. The laser diode generates an optical (laser light) signal 20 that is received by a bandpass filter 25 or, any frequency selective device including but not limited to: thin film optical interference filters, acousto-optic filters, electro-optic filters, diffraction gratings, prisms, fiber Bragg gratings, integrated optics interferometers, electroabsorption filters, and liquid crystals. The laser diode itself may comprise a standard Fabry Perot or any other type (e.g., Vertical Cavity Surface Emitting (VCSEL)), light emitting diodes, or, may comprise a Distributed Feedback semiconductor laser diode (DFB) such as commonly used for wavelength multiplexing. Preferably, the laser diode emits light in the range of 850 nm to 1550 nm wavelength range. As mentioned, the bandpass filter may comprise a thin film interference filter comprising multiple layers of alternating refractive indices on a transparent substrate, e.g., glass. As further shown in FIG. 2(a), according to the invention, there is an added sinusoidal dither modulation circuit or oscillator 22 for generating a sinusoidal dither modulation signal 27 that modulates the laser bias voltage. The sinusoidal dither signal may be electronically produced, e.g., by varying the current for a laser, or mechanically, by varying the microelectromechanical system's (MEMS) mirror to vary the wavelength. The dither modulation frequency is on the order of a few kilohertz (kHz) but may range to the Megahertz range. Preferably, the dither modulation frequency is much less than the data rate which is typically on the order of 1–10 GHz. Modulation of the laser diode bias current 15 in this manner causes a corresponding dither in the laser center wavelength. Modulated data is then imposed on the laser, and the optical output passes through the bandpass filter 25. Preferably, the filter 25 is designed with an optical splitter device (not shown) to tap off a small amount of light 29, for example, which is incident upon a photo detector receiver device, e.g., P-I-N diode 30, and converted into an electrical feedback signal 32. The amount of light that may be tapped off may range anywhere between one percent (1%) to five percent (5%) of the optical output signal, for example, however, skilled artisans will appreciate any amount of laser light above the noise level that retains the integrity of the output signal including the dither modulation characteristic, may be tapped off. The remaining laser light passes on through the filter 25 to the optical network (not shown). As the PIN diode output 32 is a relatively weak electric signal, the resultant feedback signal is amplified by amplifier device 35 to boost the signal strength. The amplified electric feedback signal 37 is input to a multiplier device 40 where it is combined with the original dither modulation signal 35. The cross product signal 42 that results from the multiplication of the amplified PIN diode output (feedback signal) 37 and the dither signal 35 includes terms at the sum and difference of the dither frequencies. The result is thus input to a low pass filter device 45 where it is low pass filtered and then averaged by integrator circuit 48 to produce an error signal 50 which is positive or negative depending on whether the laser center wavelength is respectively less than or greater than the center point of the bandpass filter. The error signal 50 is input to the laser bias voltage device 14 where it may be added (e.g., by an adder device, not shown) in order to correct the laser bias current 15 in the appropriate direction. In this manner, the bias current (and laser wavelength) will increase or decrease until it exactly matches the center of the filter passband. Alternately, the error signal 50 may be first converted to a digital form, prior to input to the bias voltage device.

Figure 2B:
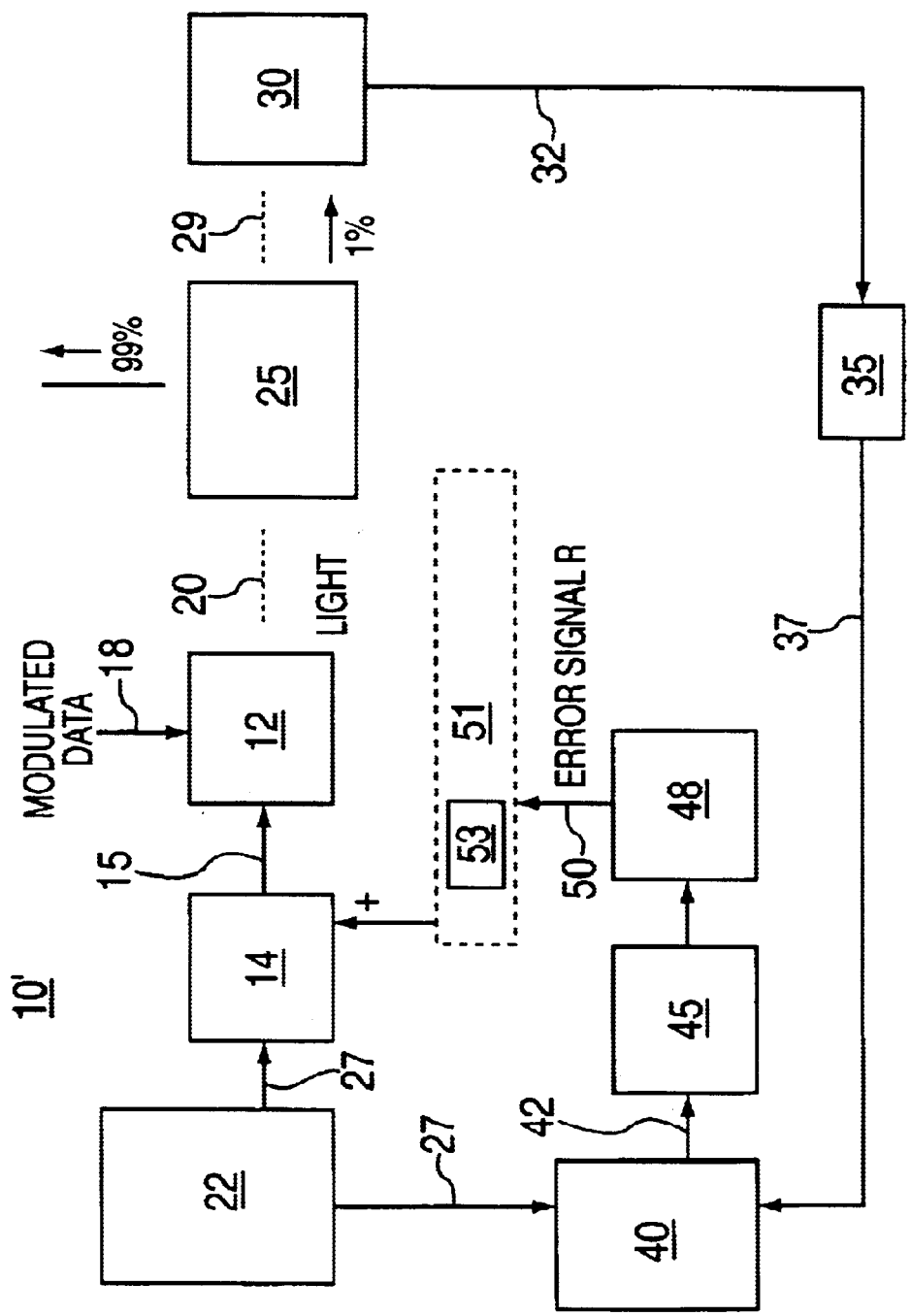

According to one aspect of the invention, the WLL will automatically maintain tracking of the laser center wavelength to the peak of the optical filter. For example, if the laser wavelength is adjusted to lie on the center of the bandpass filter, then the peak optical power may be transmitted (e.g., a logical 1). However, in some cases, it may not be desirable to enable laser alignment to the filter peak, e.g., in an optical attenuator. If the laser wavelength is moved far from the filter center wavelength, such as shown in FIG. 1(c), then the minimal optical power or no optical power is transmitted (e.g., a logical 0). Driving the laser at constant optical power improves its reliability and extends the lifetime of the laser diode. Certain types of laser diodes, as well as gas lasers and other coherent optical sources, respond better to optical attenuation applied in this manner. Accordingly, as shown in FIG. 2(b) which depicts a system 10' corresponding to the system 10 of FIG. 2(a), there is provided an attenuation control circuit, or wavelength shifter device 51, that receives the feedback error signal 50 and varies or offsets it so that the laser center wavelength may be shifted or offset in a predetermined manner according to a particular network application. The wavelength shifter 51 may permit an external input, e.g., a manually operated control element such as a knob (not shown), to introduce an arbitrary, fixed offset between the laser center wavelength and the filter peak, e.g., for optical attenuation purposes.

Alternately, the attenuation control circuit 51 of FIG. 2(b) may implement programmable digital logic functions which may be applied to the digitized signed feedback error signal to massage the signal so that offsets may be introduced in the optical power level. For instance, as shown in FIG. 2(b), a look-up table 53 may be provided which receives the signed error signal level and maps that error signal value to an offset value, e.g., an error signal value "X" is mapped to an offset value "Y", according to a desired optical attenuation, for input to the laser bias control circuit 14. It is understood that these digital logic functions may be implemented in the integrator/digitizer logic block 48 of FIG. 2(a). Thus, if it is desired to control the laser output to lie within some specific range between a maximum and minimum power level, then the digital logic performs a table lookup with the table providing bias voltage values for output to the laser within the desired range (effectively clipping the operating range of the laser). That is, increasing the feedback signal would only increase the laser output to some point, and thereafter, it would level off and become constant. It should be understood that different levels of attenuation are possible using optional logic functions in the control loop, which may be calibrated to allow for various decibel output levels from the programmable VOA.

Figure 2C:
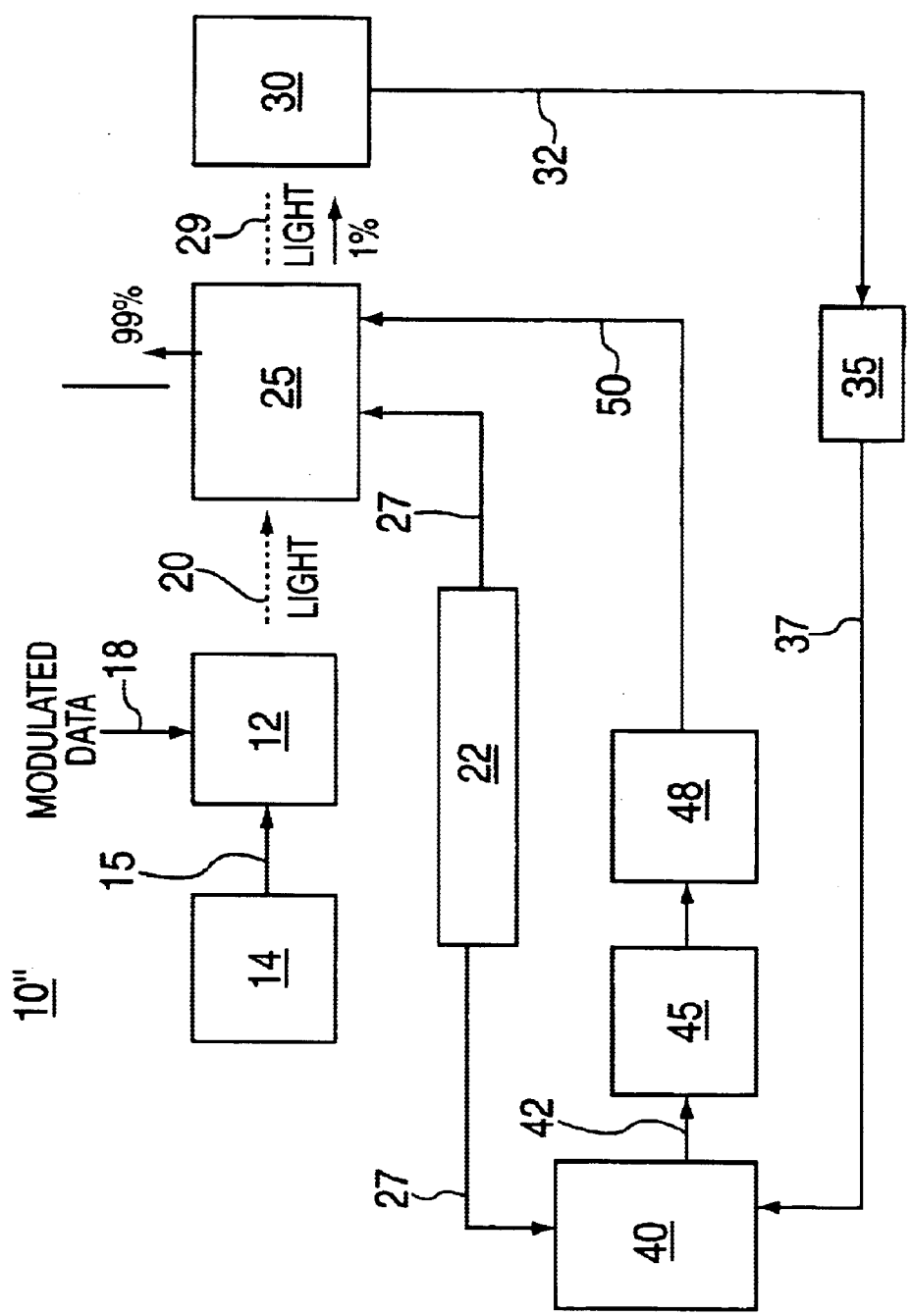
FIG. 2(c) is a general block diagram depicting the underlying system architecture for tuning tunable frequency selective devices such as a bandpass filter according to the principles of the present invention.

It should be understood that, as described in commonly-owned, co-pending U.S. patent application Ser. No. 09/865,256, the WLL servo-control system may be implemented for tuning tunable frequency selective devices such as a bandpass filter for a variety of optical network applications, including optical gain control circuits. Thus, in the embodiment depicted in FIG. 2(c), the system 10" comprises similar elements as system 10 (of FIG. 2(a)) including a bias voltage generator device 14 for applying a bias signal 15 to the laser diode 12 for generating an optical signal 20 having a peaked spectrum function. This signal 20 is input to a tunable frequency selective device 25, e.g., a tunable bandpass filter. As shown in FIG. 2(c), however, the sinusoidal dither/driver device 22 is implemented for modulating the peak center frequency of filter pass band with a small dither signal 27. A small amount of light 29 is tapped off the output of the filter 25 for input to the photodetector device, e.g., PIN diode 30, where the optical signal is converted to electrical signal 32, amplified by amplifier device 35, and input to the mixer device 40 which additionally receives the dither signal 27. The mixer device generates the vector cross product 42 of the amplified feedback signal 37 with the dither signal 27 and that result is low-pass filtered, and smoothed (e.g., integrated) by integrator device 48 to provide error signal 50, in the manner as will be discussed herein with reference to FIGS. 3–7. This error signal 50 may be a bi-polar signal and may be used to dynamically adjust the peak center frequency of the filter passband until it matches the center frequency of the laser signal input 20.

The operating principle of the WLL is further illustrated in the timing and signal diagrams of FIGS. 3–7. FIGS. 3(a)–3(c) particularly depicts the relationship between laser optical power as a function of wavelength for three instances of optic laser signals: a first instance (FIG. 3(a)) where the laser signal frequency center point 21 is less than the bandpass function centerpoint as indicated by the filter bandpass function 60 having centerpoint 62 as shown superimposed in the figures; a second instance (FIG. 3(b)) where the laser frequency center point 21 is aligned with the bandpass function centerpoint 62; and, a third instance (FIG. 3(c)) where the laser frequency center point 21 is greater than the bandpass function centerpoint 62. In each instance, as depicted in corresponding FIGS. 4(a)–4(c), the laser diode drive voltage signal 15 is shown dithered (a sinusoid) resulting in the laser wavelength dithering in the same manner. The dithered laser diode spectra passes through the filter, and is converted to electrical form by the PIN diode 30. In each instance of the laser signals depicted in FIGS. 3(a) and 3(c) having frequency centerpoints respectively less than and greater than the band pass filter centerpoint, it is the case that the dither harmonic spectra does not pass through the frequency peak or centerpoint of the bandpass filter. Consequently, the resulting output of the PIN diode is an electric sinusoidal signal of the same frequency as the dither frequency such as depicted in corresponding FIGS. 5(a) and 5(c). It is noted that for the laser signals at frequencies below the peak (FIG. 3(a)) the feedback error signal 32 corresponds in frequency and phase to the dither signal (FIG. 5(a)), however for the laser signals at frequencies above the peak (FIG. 3(c)) the feedback error signal 32 corresponds in frequency but is 180° opposite phase of the dither signal (FIG. 5(c)). Due to the bipolar nature of the feedback signal (error signal) for cases when the laser signal centerpoint is misaligned with the bandpass filter centerpoint, it is thus known in what direction to drive the laser diode (magnitude and direction), which phenomena may be exploited in many different applications. For the laser signal depicted in FIG. 3(b) having the laser frequency center point aligned with the bandpass function centerpoint, the dither harmonic spectra is aligned with and passes through the frequency peak (maximum) of the bandpass filter twice. That is, during one cycle (a complete round trip of the sinusoid dither signal), the dither signal passes though the centerpoint twice. This results in a frequency doubling of the dither frequency of the feedback signal 32, i.e., a unique frequency doubling signature, as depicted as PIN diode output 32' in FIG. 5(*b*) showing an feedback error signal at twice the frequency of the dither frequency. Thus, in each instance, as depicted in corresponding FIG. 5(*b*), the resulting feedback signal exhibits frequency doubling if the laser center wavelength is aligned with the filter center wavelength; otherwise it generates a signal with the same dither frequency, which is either in phase (FIG. 5(*a*)) or out of phase (FIG. 5(*c*)) with the original dither modulation. It should be understood that, for the case where there the laser center frequency is misaligned with the bandpass filter peak and yet there is exhibited partial overlap of the dither spectra through the bandpass filter peak (i.e., the centerpoint peak is traversed twice in a dither cycle), the PIN diode will detect partial frequency doubling laser at opposite phases depending upon whether the laser center frequency is inboard or outboard of the filter center frequency. Thus, even though partial frequency doubling is detected, it may still be detected from the feedback signal in which direction and magnitude the laser signal should be driven for alignment.

Referring now to FIGS. 6(*a*) and 6(*c*), for the case when the laser and filter are not aligned, the cross product signal 42 resulting from the mixing of the amplified feedback error with the original dither sinusoid is a signed error signal either at a first polarity (for the laser signals at frequencies below the bandpass filter centerpoint), such as shown in FIG. 6(*a*) or, at a second polarity (for the laser signals at frequencies above the bandpass filter centerpoint), such as shown in FIG. 6(*c*). Each of these signals may be rectified and converted into a digital output laser bias voltage signal 48 as shown in respective FIGS. 7(*a*) and 7(*c*), which are fed back to respectively increase or decrease the laser current (wavelength) in such a way that the laser center wavelength moves closer to the bandpass filter centerpoint. For the case when the laser and filter are aligned, the cross product generated is the frequency doubled signal (twice the frequency of the dither) as shown in the figures. Consequently, this results in a 0 V dc bias voltage (FIG. 7(*b*)) which will maintain the laser frequency centerpoint at its current wavelength value.

Figure 8:
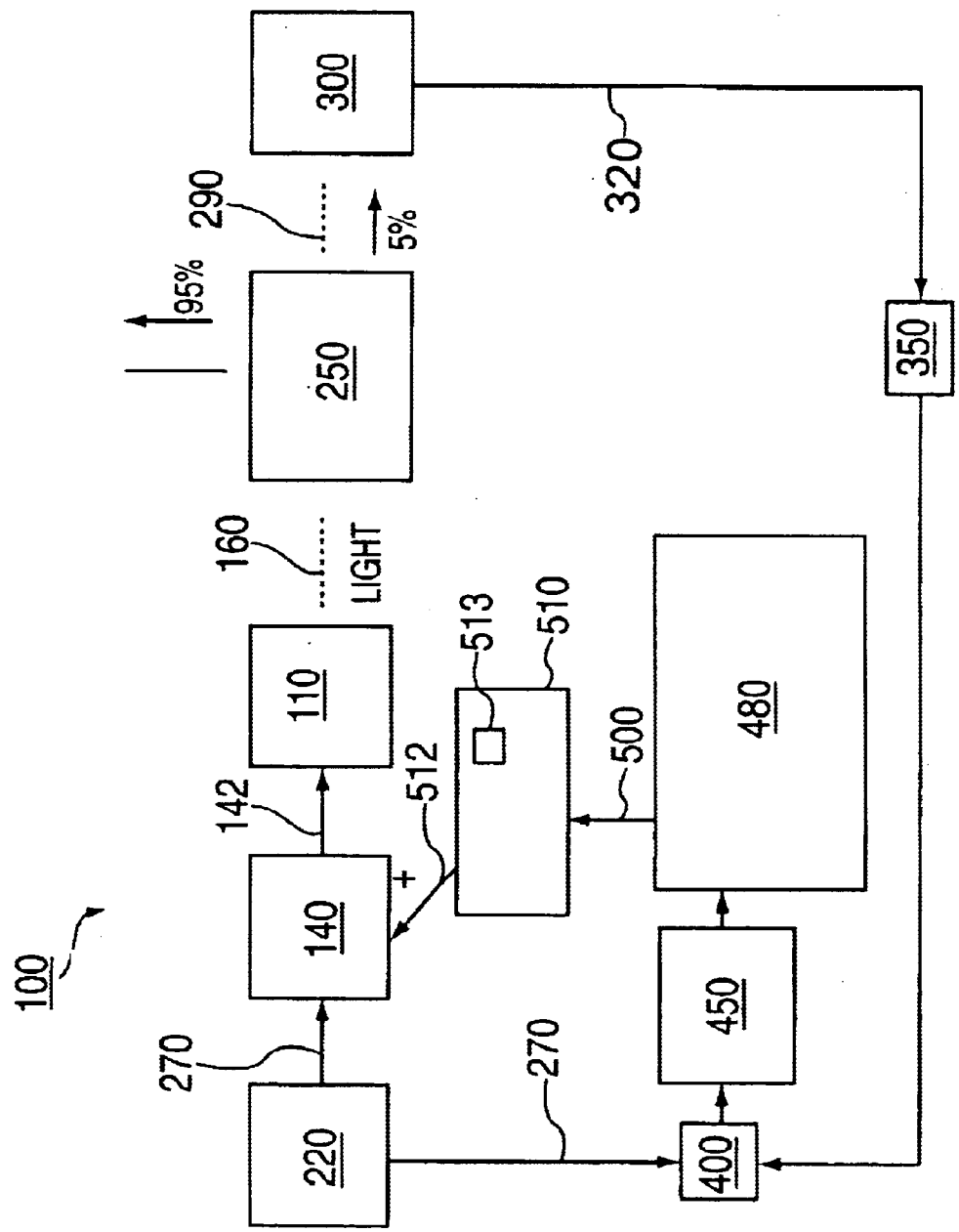
FIG. 8 illustrates an embodiment of the variable optical attenuator circuit of the invention implemented for controlling an array of optical signal generators in a WDM or DWDM system.

According to a further aspect of the invention, the VOA principle employing the WLL may be used to provide gain equalization in a laser array or laser bank implemented for instance in a WDM system. FIG. 8 illustrates the VOA principle applied to an optical system 100 comprising an array of lasers 110. Specifically, as shown in FIG. 8, the system 100 includes a one dimensional or two dimensional array 110 of optical signal generators, e.g., VCSEL laser diode devices, for providing laser light 160 at different wavelengths to form multiple communication channels in an optical communication system. Each of the laser diodes in array 110 generates an optical signal 160 in response to application of a respective bias voltage 142 provided by a respective bias voltage generator device 140. According to the WLL principle, the optical signals out of array 110 are input to a respective filter device provided in a filter bank 250 which may include any wavelength selective elements including, but not limited to: array waveguide gratings, in-fiber or in-waveguide Bragg gratings, banks of interference filters, etc. These filters may be implemented in paired arrangements with the VCSEL or other laser source arrays and accommodate the multiple wavelength extensions relevant to a WDM/DWDM optical system. As further shown in FIG. 8, a small percentage of the resulting filtered light signals 290 is tapped from the optical filter 250 at each wavelength for input to a commercially available photodetector device such as P-i-N diode 300 for detecting the level of optical signal light. Preferably, the light output 290 from the filter bank 250 passes through a beamsplitter (not shown), which samples a small portion of the light for the P-I-N detector 300. The amount of light 290 that may be split of may range anywhere between one percent (1%) to five percent (5%) of the optical output signal 160, however, skilled artisans will appreciate an amount of light 290 above the noise level that retains the integrity of the output signal including a dither modulation characteristic, as will be explained, may be tapped off. Furthermore, the tapped signals 290 are representative of the peaked passband response of the individual filters provided in filter bank 250.

As further shown in FIG. 8, the photodetector device 300, in response, generates an electric signal 320 that is proportional to the amount of light detected. In the manner as will be described, the WLL servo-control feedback loop is implemented to adjust the bias voltage 142 in a manner to control the source wavelengths of each optical signal in the optical network. As further shown in FIG. 8, there is provided an external oscillator 220 which generates a low frequency dither modulation signal 270 (e.g., a sinusoidal signal in the kHz frequency range or less, however adjustable as needed, in order to avoid interference with other operating frequencies in the system). As described in greater detail herein, the low frequency dither modulation signal 270 is imposed on the bias voltage generator device 140 for a laser diode to modulate the bias current of that laser diode, and hence that laser diode's output wavelength. The laser diode's wavelength is controlled by the bias current in this embodiment, although other applications are possible such as controlling the laser temperature, for example. The laser voltage bias is thus modulated by a dithering current from the signal generator. Variations in the laser bias produce a corresponding dither in the center wavelength of each laser output of the array. The light emerging from the filter is monitored by the photodetector 300 which generates the dither-modulated electrical signal 320. The electrical signal 320 is amplified by amplifier device 350, and, is fed back to a mixer device 400, where it is multiplied with the low frequency modulation signal 270 from the same external oscillator 220 used to modulate the bias current of the laser diode at the low modulation frequency. This results in the cross product of the two signals as described herein. Implementing low pass filter 450, the resulting signal is low pass filtered to remove higher order terms, and then integrated and optionally digitized by device 480 to result in an error signal 500 which may be used to determine the laser center wavelength with respect to the respective optical filter's passband. This signal 500 provides the means of controlling both the amount and direction in which the laser center wavelength may be adjusted for each laser device in the array 110. Preferably, the error signal 500 is fed back through a digital array controller or bus controller 510 which generates the appropriate laser diode drive voltage 512 for the bias signal generator device 140. For instance, the array controller circuit 510 may include a look-up table 513 for mapping error signal values against input bias currents for adjusting the center wavelength of the optical signal in accordance with a desired amount of attenuation (i.e., center wavelength offset) or gain according to a particular network application. In this manner, the resulting VOA for laser arrays provides the added functionality of a gain equalizer.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. An apparatus for attenuating optical signals communicated in an optical network comprising:

optical signal generator for generating optical signals, each optical signal having a peaked spectrum function including a center wavelength;

an optical filter element for receiving and filtering an optical signal, said optical filter element exhibiting a peaked passband function including a center wavelength; and, a wavelength-locked loop servo-control circuit for enabling real time alignment of said optical signal center wavelength with said peaked passband function of said optical filter element, said optical signal center wavelength capable of being aligned at a wavelength corresponding to maximum overlap with said center wavelength of said peaked passband function of said optical filter for maximum transfer of said output optical signal by said filter element and minimum overlap with said peaked passband function of said optical filter so that said output optical signal may be attenuated in said optical system, said wavelength-locked loop servo-control circuit comprising:

a means for applying a dither modulation signal at a dither modulation frequency to said optical signal to generate a dither modulated optical signal through said optical filter element;

a means for converting a portion of dither modulated optical signal to into a feedback signal;

a means for generating an error signal comprising a vector cross product of said feedback signal and said dither modulated optical signal; and a means responsive to said error signal for adjusting the peak spectrum function of said optical signal according to a desired amount of optical signal attenuation, wherein said center wavelength of said optical signal is adjustable between said maximum overlap and minimum overlap with said center wavelength of said peaked passband function of said optical filter and becomes aligned for maximum overlap with said center wavelength of said peaked passband function of said optical filter when said frequency characteristic of said feedback error signal is two times said dither modulation frequency.

2. The apparatus for attenuating optical signals communicated in an optical network as claimed in claim 1, wherein said optical signal is a laser signal, said optical signal generator comprising:

laser diode device for generating a laser signal; and, a laser bias control device for providing a bias signal to said laser diode device for adjusting the peak spectrum function of said laser signal, wherein said bias control device receives said error signal and adjusts said laser bias signal according to a value of error signal plus an offset corresponding to a desired amount of optical signal attenuation.

3. The apparatus for attenuating optical signals communicated in an optical network as claimed in claim 2, wherein said laser bias control device includes look-up table comprising values of error signals mapped to laser bias signal values corresponding to desired degrees of attenuation, said center wavelength of said optical signal being adjusted in accordance with said mapped laser bias signal values.

4. The apparatus for attenuating optical signals communicated in an optical network as claimed in claim 1, wherein said converting mechanism comprises a photodetector device.

5. The apparatus for attenuating optical signals communicated in an optical network as claimed in claim 4, wherein said photodetector device is a p-i-n diode.

6. The apparatus for attenuating optical signals communicated in an optical network as claimed in claim 1, wherein said means for generating an error signal comprising a vector cross product includes a mixer device capable of combining said converted feedback signal with said dither modulation signal and generating a vector cross-product signal having components representing a sum and difference at dither frequencies.

7. The apparatus for attenuating optical signals communicated in an optical network as claimed in claim 5, further including:

low-pass filter device for filtering said vector cross-product signal; and integrator circuit for averaging said vector cross-product signal to generate said error signal, whereby said error signal is positive or negative depending on whether a center wavelength of said optical signal is respectively less than or greater than said center wavelength of said optical filter.

8. The apparatus for attenuating optical signals communicated in an optical network as claimed in claim 6, further including digitizer device for digitizing said error signal prior to input to said laser bias control device.

9. The apparatus for attenuating optical signals communicated in an optical network as claimed in claim 1, employed in a wavelength division multiplexing (WDM) system including an array of multiple optical signal generators each for generating an optical signal having a peaked spectrum function including a center wavelength, and, a corresponding array of optical filter elements, an optical filter element of said array on one to one correspondence with an optical signal generator for receiving and filtering a corresponding optical signal.

10. The apparatus for attenuating optical signals communicated in an optical network as claimed in claim 9, wherein said wavelength-locked loop servo-control circuit includes array control device for enabling real time alignment of an optical signal center wavelength of a specific optical signal generator in said array with said peaked passband function of its corresponding optical filter in said filter array, each said optical signal center wavelength capable of being aligned at a wavelength corresponding to maximum overlap with said center wavelength of said peaked passband function of its respective said optical filter for maximum transfer of said output optical signal by said filter element and minimum overlap with said peaked passband function of said optical filter so that said output optical signal may be attenuated in said optical system.

11. The apparatus for attenuating optical signals communicated in an optical network as claimed in claim 10, wherein said wavelength-locked loop servo-control circuit provides gain equalization function by enabling specific channels in said WDM system to be attenuated in a controlled pattern.

12. A method for attenuating optical signals communicated in an optical network comprising the steps of:

a) providing optical signal generator for generating optical signals, each optical signal having a peaked spectrum function including a center wavelength;

b) providing optical filter element for receiving and filtering an optical signal, said optical filter element exhibiting a peaked passband function including a center wavelength; and, c) enabling real time alignment of said optical signal center wavelength with said peaked passband function of said optical filter, said optical signal center wavelength capable of being aligned at a wavelength corresponding to maximum overlap with said center wavelength of said peaked passband function of said optical filter for maximum transfer of said output optical signal by said filter element and minimum overlap with said peaked passband function of said optical filter so that said output optical signal may be attenuated in said optical system, said real-time alignment step further comprising:

d) applying a dither modulation signal at a dither modulation frequency to said optical signal to generate a dither modulated optical signal through said optical filter element having a peak frequency response at a desired wavelength;

e) converting a portion of dither modulated optical signal to into a feedback signal;

f) generating an error signal comprising a vector cross product of said feedback signal and said dither modulated optical signal; and g) adjusting the peak spectrum function of said optical signal according to a desired amount of optical signal attenuation, wherein said center wavelength of said optical signal is adjustable between said maximum overlap and minimum overlap with said center wavelength of said peaked passband function of said optical filter and becomes aligned for maximum overlap with said center wavelength of said peaked passband function of said optical filter when said frequency characteristic of said error feedback signal is two times said dither modulation frequency.

13. The method as claimed in claim 12, further including the step of:

providing a laser diode device for generating a laser signal; and, providing a bias signal to said laser diode device for adjusting a peak spectrum function of said laser signal, wherein said adjusting step includes adjusting a center wavelength characteristic of said laser signal according to a value of said error signal plus an offset corresponding to a desired amount of optical signal attenuation.

14. The method as claimed in claim 13, wherein said step of adjusting a center wavelength characteristic of said laser signal includes the steps of:

implementing a look-up table comprising values of error signals mapped to laser bias signal values corresponding to desired degrees of attenuation, said center wavelength of said laser signal being adjusted in accordance with said mapped laser bias signal values.

15. The method as claimed in claim 13, wherein said generating step d) comprises:

combining said converted feedback signal with said dither modulation signal and generating said vector cross-product signal having components representing a sum and difference at dither frequencies.

filtering said vector cross-product signal; and averaging said vector cross-product signal to generate said error signal, said error signal being positive or negative depending on whether a center wavelength of said amplified optical signal output is respectively less than or greater than a center wavelength of said peaked passband optical filter function.

16. An apparatus for providing gain equalization in a wavelength division multiplexing system comprising an array of optical signal generators each for generating an optical signal having a peaked spectrum function including a center wavelength, and a corresponding array of optical filter elements, each filter element for receiving and filtering a corresponding optical signal from said optical signal generator array, each said optical filter element exhibiting a peaked passband function including a center wavelength, said apparatus comprising:

a wavelength-locked loop servo-control circuit for enabling real time alignment of each said optical signal center wavelength generated by said optical signal generator array with said peaked passband function of its respective optical filter element in said filter array, each said optical signal center wavelength capable of being aligned at a wavelength corresponding to maximum overlap with said center wavelength of the peaked passband function of its respective optical filter for maximum transfer of said output optical signal by its respective filter element and capable of being aligned at a wavelength corresponding to minimum overlap with said peaked passband function of its respective optical filter so that said output optical signal may be attenuated in said optical system, said wavelength-locked loop servo-control circuit comprising:

a means for applying a dither modulation signal at a dither modulation frequency to each said optical signal of said array to generate a plurality of dither modulated optical signals for transmission through its respective optical filter element;

a means for converting a portion of each dither modulated optical signal into a corresponding feedback signal;

a means for generating a respective error signal comprising a vector cross product of said feedback signal and said dither modulated optical signal; and a means responsive to each respective error signal for adjusting the peak spectrum function of its corresponding optical signal according to a desired amount of optical signal attenuation, wherein a center wavelength of each said optical signal is adjustable between said maximum overlap and minimum overlap with said center wavelength of said peaked passband function of its respective optical filter and may become aligned for maximum overlap with said center wavelength of said peaked passband function of said respective optical filter when said frequency characteristic of said feedback error signal is two times said dither modulation frequency.

* * * * *